United States Patent [19]
Brooks et al.

[11] Patent Number: 5,625,511
[45] Date of Patent: Apr. 29, 1997

[54] STEPPED SPINDLE MOTOR SHAFT TO REDUCE DISK DRIVE ACOUSTIC NOISE

[75] Inventors: Peter E. Brooks, Rochester, Minn.; Gregory M. Frees, Sunnyvale, Calif.; Daniel R. Stacer, Rochester, Minn.

[73] Assignee: International Business Machines Corporation, Armonk, N.Y.

[21] Appl. No.: 371,356

[22] Filed: Jan. 11, 1995

[51] Int. Cl.$^6$ .............. G11B 17/02; H02K 5/16; F16C 3/02
[52] U.S. Cl. .............. 360/99.08; 369/263; 310/42; 310/51; 464/180
[58] Field of Search .............. 360/99.08, 99.09, 360/99.11, 98.07, 99.04; 369/263; 310/51, 42, 67 R; 29/596; 464/179, 180

[56] References Cited

U.S. PATENT DOCUMENTS

| | | | |
|---|---|---|---|
| 4,339,873 | 7/1982 | Kanamaru et al. | 29/598 |
| 4,585,967 | 4/1986 | Mayer et al. | 310/42 |
| 5,227,686 | 7/1993 | Ogawa | 360/99.08 |
| 5,274,288 | 12/1993 | Stefansky | 360/99.08 |
| 5,282,100 | 1/1994 | Tacklind et al. | 360/97.02 |
| 5,346,432 | 9/1994 | Greulich et al. | 464/180 |
| 5,354,237 | 10/1994 | Amborn et al. | 464/180 |
| 5,357,163 | 10/1994 | Minakuchi et al. | 310/42 |
| 5,376,850 | 12/1994 | Elsing et al. | 310/67 R |
| 5,452,156 | 9/1995 | Uda et al. | 360/97.01 |
| 5,453,650 | 9/1995 | Hashimoto et al. | 310/42 |

FOREIGN PATENT DOCUMENTS

| | | |
|---|---|---|
| 63-247910 | 10/1988 | Japan . |
| 1-8574 | 1/1989 | Japan . |
| 04265673 | 9/1992 | Japan . |
| 6-52626 | 2/1994 | Japan . |

OTHER PUBLICATIONS

*IBM Technical Disclosure Bulletin*, vol. 36, No. 9B, Sep. 1993, pp. 41–42, by Ando et al, for "Low–Noise Spindle Motor For Small Hard Disk Drive".

*IBM Technical Disclosure Bulletin*, vol. 37, No. 10, Oct. 1994, pp. 205–208, by Z. Boutaghou, for "Reducing Motor Excitation To Casting/ Bearings".

*Primary Examiner*—Stuart S. Levy
*Assistant Examiner*—Paul J. Ditmyer
*Attorney, Agent, or Firm*—Merchant, Gould, Smith, Edell, Welter & Schmidt, P.A.

[57] ABSTRACT

A spindle motor shaft having variable geometrical features for adjusting the torsion mode frequency of the shaft/stator assembly. The variable geometric features allow the torsion mode frequency to be tuned away from the driving force frequency of the motor. Variable geometrical features for the shaft may include circumferential grooves, radial slots cut through the shaft, or transverse holes disposed along the axis of the shaft. The radial slots have a longitudinal axis that is parallel to the axis of the shaft. Where circumferential grooves are used, the circumferential grooves may be designed to form a locator region along the shaft axis to promote axial alignment of the shaft and stator. Thermal track-misregistration (TMR) or screw torque problems are not introduced in the process of reducing or eliminating the acoustic problem thereby establishing a torsion mode frequency which is not subject to change due to temperature or time. Further, the removal of material from the shaft reduces the torsional stiffness of the shaft and lowers the torsion mode frequency of the shaft. Finally, the use of circumferential grooves prevents the wicking of excess epoxy up the shaft by the movement of the stator during the assembly/ manufacturing process, which may lead to an undesirable increase in the stiffness.

28 Claims, 6 Drawing Sheets

STEPPED SPINDLE MOTOR SHAFT TO REDUCE DISK DRIVE ACOUSTIC NOISE

BACKGROUND OF THE INVENTION

1. Field of the Invention

This invention relates in general to an apparatus for reducing acoustic noise in disk drives, and more particularly, to a spindle motor shaft having predetermined geometrical features that may be adjusted to tune the torsion mode frequency of the spindle motor shaft away from the driving frequency of the motor.

2. Description of Related Art

Disk drives can produce a relatively large amount of acoustic noise. For example, causing a storage disk in a disk drive to spin at high speeds requires exciting the motor at high frequencies. These high frequencies in turn excite the stator windings and laminations. This energy is then transmitted to the bearings, disks, casting, and the actuator assembly.

In many disk drive designs, a disk drive spindle motor has a stator that is attached to the spindle motor shaft. The stator supports windings through which current is driven to generate a magnetic field. This magnetic field is used to exert a force on magnets attached to the rotor. The rotor also has a hub attached to it whereon at least one disk is attached. The spindle motor shaft is attached to the disk drive device enclosure. This stator/shaft structure has natural modes of vibration. One of the fundamental modes of vibration for this structure is torsion. When motor drive forces are generated by current flowing through the stator windings, a force is exerted on the magnets of the motor and an opposite force is exerted on the stator. This causes the stator and shaft to oscillate about the longitudinal axis of the shaft in its torsional mode of vibration. Since one or both ends of the shaft are fixed to the device enclosure, the shaft acts like a torsional spring while the stator acts as a flywheel inertia.

When the magnetic forces in an operating motor act to excite the torsion mode of the shaft/stator assembly, reactively large vibrations in the shaft/stator assembly can result if a component frequency of the magnetic force is coincident or near the torsion mode frequency. The energy from the resulting vibration flows from the shaft/stator assembly into the device enclosure to which it is attached. The device enclosure then acts like a speaker with significant surface area to produce acoustic emissions from the drive.

Many approaches have been used to reduce the source of acoustic noise in disk drives. Constrained-layer damping has been used on device enclosures to reduce acoustic noise. For example, constrained-layer damping material has been applied to the end of a spindle motor shaft. Further, it is known that applying a damping material between the inner diameter of the stator and outer diameter of the shaft decouples the stator vibrations from the shaft.

One approach for reducing acoustic noise is disclosed in U.S. Pat. No. 5,282,100, issued Jan. 25, 1994, to Boyle et al., entitled "DISK DRIVE WITH REDUCED ACOUSTIC NOISE", and incorporated herein by reference. Boyle et al. disclose providing mechanical isolation and sound dampening between the cover and interior chamber of a disk drive enclosure. The acoustic noise otherwise emanating away from the inner cover is attenuated. However, the amplitude of the acoustic noise at the source is not reduced.

Another approach for reducing acoustic noise in disk drives is disclosed in Japanese Patent 06-52626, invented by Yotaro Sanada, entitled "SPINDLE MOTOR FOR MAGNETIC DISK DEVICE", and incorporated herein by reference. Sanada discloses interposing O-rings between the armature and the shaft to suppress the transmission of vibration from the shaft to the housing and cover.

Yet another approach for reducing vibration of a spindle shaft is disclosed in Japanese Patent 01-8574, invented by Iizuka et al., entitled "DISK STORAGE DEVICE", and incorporated herein by reference. Iizuka et al. disclose using a support arm to suppress the lateral vibration of the spindle shaft.

IBM Technical Disclosure Bulletin, Vol. 37, No. 10, October 1984, pp. 205–208, entitled "REDUCING MOTOR EXCITATION TO CASTING/BEARINGS", incorporated herein by reference, discloses reducing motor vibrations from exciting structural modes by interposing a dampening material between the spindle shaft and the stator. The interposition of the dampening material between the stator and the shaft reduces the amplitude of the excitations transmitted to the bearings and to the structure. The vibration isolation reduces the spindle NRRO and file acoustics. Anisotropic properties are desirable for the damping material because the radial components of the excitation forces are much greater than the axial components. Thus, the dampening material provides high damping characteristics in the radial direction.

IBM Technical Disclosure Bulletin, Vol. 36, No. 9B, September 1993, pp. 41–42, by Ando et al., entitled "LOW-NOISE SPINDLE MOTOR FOR SMALL HARD DISK DRIVE", incorporated herein by reference, discloses adjusting the ball pitch circle diameter of bearings in the spindle motor to prevent beating tones in disk drives.

Nevertheless, none of these prior approaches have focused on adjusting the torsion mode frequency to eliminate acoustic noise in disk drives. At the root of the acoustic mechanism is the forcing function. The magnetic forces in the motor are very complicated and have a rich frequency content. One of the largest spectral components of the magnetic force is the commutation or "switching" frequency of the motor driver. When the frequency of the shaft/stator torsion mode is near or coincident with particular magnetic motor force components, the result can be a relatively loud pure-tone acoustics problem for the file (i.e. a continuous "screaming" type sound).

For example, for a 9-slot 8-pole (9×8) motor, there are 24 "switches" per mechanical revolution. A 9×8 motor spinning at 7200 RPM (120 Hz) has a commutation frequency of 2880 Hz (f=24×120=2880 Hz). Furthermore, the commutation frequency generally has harmonics above the fundamental (i.e., there will typically be energy at $2f$, $3f$, $4f$, etc.). When the torsion frequency of the shaft/stator assembly is near the driving force frequency or one of its harmonic components, the sound pressure of the harmonic component becomes high and produces a characteristic "scream" or "whine."

The amplitude of the "whine" can be reduced by loosening or tightening the screws that attach the spindle to the device enclosure, and/or by damping the device enclosure with a constrained-layer damper (CLD). Loosening the screws has a positive effect because the torsion mode frequency is reduced in the process because the end conditions on the shaft become less "fixed". This moves the torsion mode frequency of the stator/shaft assembly away from the fixed excitation frequency. The constrained-layer damper has a positive effect by damping the "speaker" mechanism. However, these measures only work as an interim fix, since it is desirable to eliminate the constrained-layer damper and to reinstate the plan-of-record (POR) screw torque during manufacturing.

None of the prior attempts at damping or attenuating acoustic noise in disk drives discussed have focused on shaft designs which allow the torsion mode frequency of the shaft/stator assembly to be tuned and thus moved away from the driving force.

It can be seen then that there is a need for spindle motor shaft designs having tunable torsion mode frequencies for reducing acoustic noise in a disk drive.

It can also be seen that there is a need for a spindle shaft design having reduced torsional stiffness due to selected geometrical features.

SUMMARY OF THE INVENTION

To overcome the limitations in the prior art described above, and to overcome other limitations that will become apparent upon reading and understanding the present specification, the present invention discloses creating variable geometrical features on a spindle motor shaft for adjusting the torsional mode frequency of the shaft.

The present invention solves the above-described problems by providing geometric features that can be varied to change the torsion mode frequency of the shaft thereby allowing the torsion mode frequency to be tuned away from the driving force frequency of the motor.

A system in accordance with the principles of the present invention comprises a shaft with predetermined geometric features coupled to a stator having windings for generating motor drive forces at a driving force frequency. The shaft and stator have a torsion mode frequency associated with the geometrical features and material properties of the shaft/stator assembly. Accordingly, the geometrical features of the shaft may be varied to adjust the torsion mode frequency. For example, variable geometrical features for the shaft may include circumferential grooves, radial slots cut through the shaft, or transverse holes disposed along the axis of the shaft.

The radial slots have a longitudinal axis that is parallel to the axis of the shaft. Where circumferential grooves are used, the circumferential grooves may be designed to form a locator region along the shaft axis to promote axial alignment of the shaft and stator. The locator region comprises an ungrooved portion of the shaft adjacent a circumferential groove. A short axial length of the stator then overlaps the circumferential groove and a portion of the ungrooved area of the shaft. Finally, the shaft includes a knurled region disposed generally at the center of the shaft that is coated with epoxy while the stator is press-fitted over the knurled region.

One aspect of the present invention is that the dimensions of the various geometric features can be adjusted to produce the desired frequency of the torsion mode. In other words, the torsion mode frequency is continuously tunable.

Another aspect of the present invention is that the torsion mode frequency may be tuned away from the driving force frequency of the motor.

Another aspect of the present invention is that thermal track-misregistration (TMR) or screw torque problems between the shaft and the device enclosure which result from other approaches are not introduced in the process of reducing or eliminating the acoustic problem.

Another aspect of the present invention is that removal of material from the shaft reduces the torsional stiffness of the shaft and lowers the torsion mode frequency of the shaft.

Another aspect of the present invention is that circumferential grooves prevent the wicking of excess epoxy up the shaft by the movement of the stator during the assembly/manufacturing process.

Yet another aspect of the present invention is that a locator region may be formed along the shaft axis to promote axial alignment of the shaft and stator.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a stepped spindle motor shaft having predetermined geometrical features for detuning the torsion mode frequency of the spindle motor shaft/stator assembly from the driving frequency of the motor.

Figure 1B:
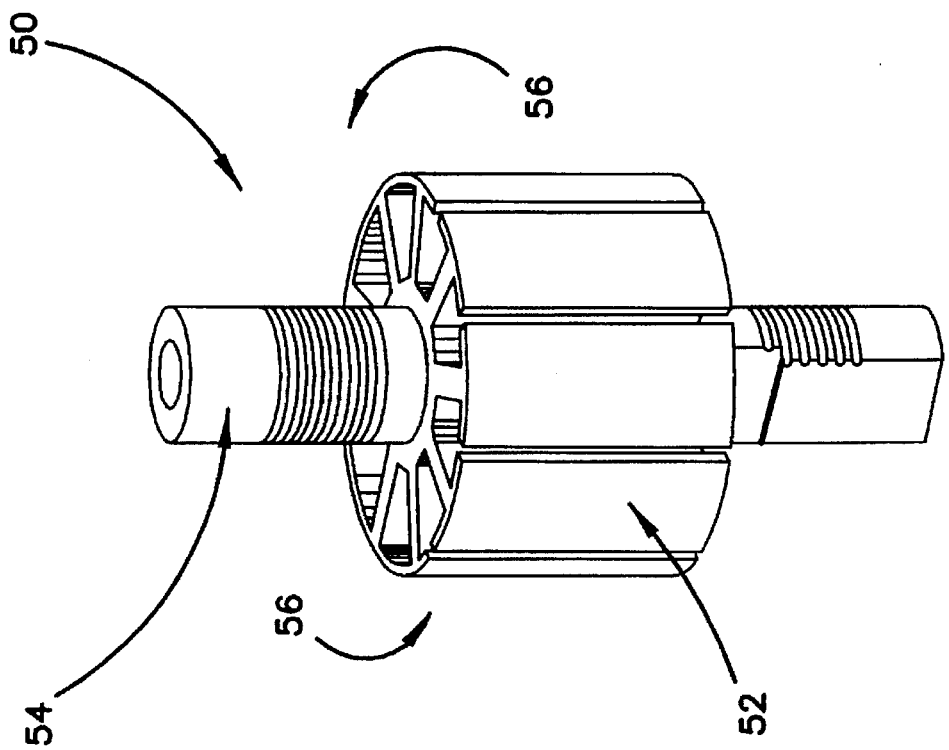
FIG. 1b is an illustration of a typical shaft/stator assembly.
Figure 1A:
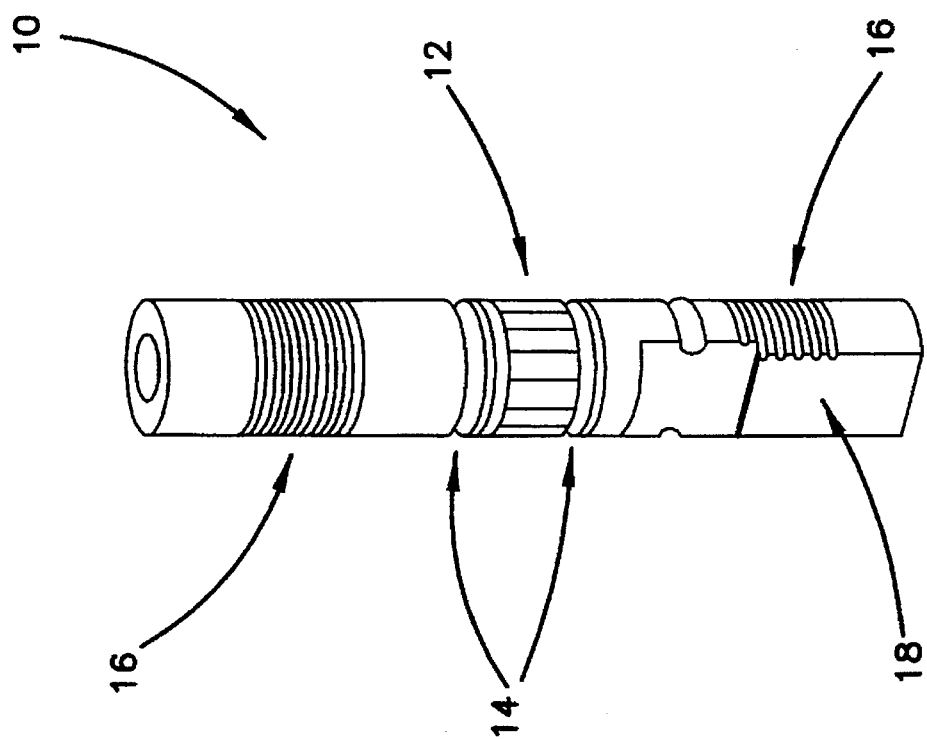
FIG. 1a is an illustration of a typical spindle motor shaft.

FIG. 1a illustrates a typical shaft 10. The shaft has a knurled region 12 for attachment of the stator 52 (see FIG. 1b). Above and below the knurled region are undercuts 14 for trapping and encapsulating metallic debris generated in the press-fitting of the stator 52 (see FIG. 1b) to the spindle shaft 10. At the upper and lower portion of the shaft 10 are bond grooves 16 for bearing races. Shown at the lower portion of the shaft 10 is a flat area 18 for routing of the stator winding leads (not shown).

FIG. 1b illustrates a typical shaft/stator assembly 50. The stator 52 is press-fitted onto the shaft 54. Like all structures, the shaft/stator assembly 50 has natural modes of vibration. One of the fundamental modes of vibration of the shaft/stator assembly is torsion vibration in the direction indicated by arrows 56. Since one or both ends of the shaft 54 are fixed to the device enclosure (not shown), the shaft 54 acts like a torsional spring while the stator 52 acts as a flywheel inertia. The magnetic forces in the operating motor act to excite the torsion mode of the shaft/stator assembly 50. When a component frequency of the magnetic force is coincident or near the torsion mode frequency, reactively large vibrations in the shaft/stator assembly 50 result. The energy from the vibration then flows from the shaft/stator assembly 50 into the device enclosure to which it is attached. Accordingly, the device enclosure acts like a speaker with significant surface area to produce acoustic emissions from the drive. For example, the torsion mode of the shaft/stator assembly 50 may be very close to the commutation frequency or one of its harmonic components and therefore the drive produces a characteristic "scream" or "whine" due to the acoustic mechanism described above.

Figure 2:
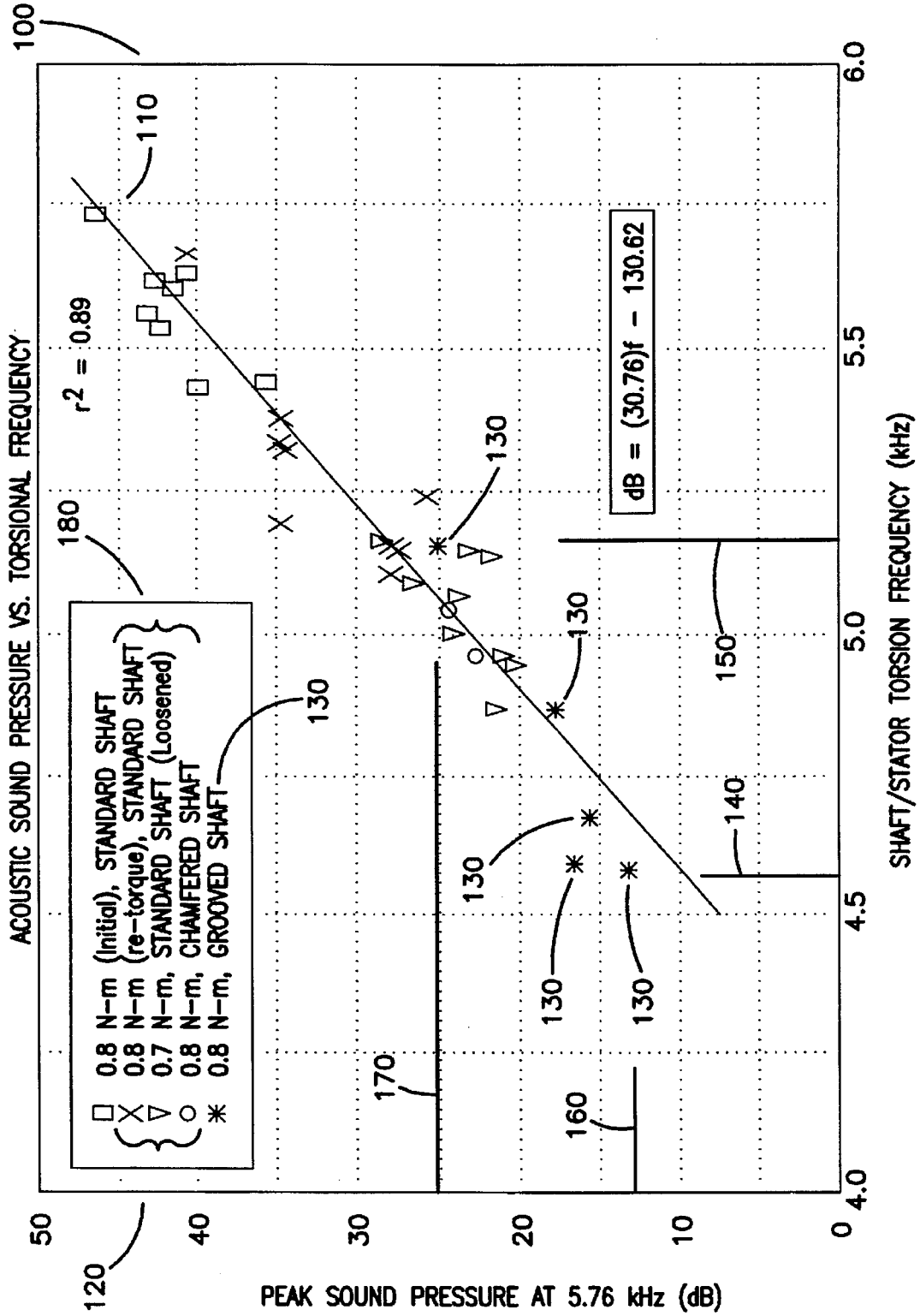
FIG. 2 is a graph of the acoustic sound pressure vs. torsion mode frequency.

FIG. 2 is a graph of the acoustic sound pressure vs. torsion mode frequency 100 which illustrates the effect of de-tuning the torsion mode frequency from the driving force frequency for a disk drive (e.g., 5.76 kHz in the example discussed herein). To eliminate the root of the acoustic mechanism, the forcing function must be addressed. The magnetic forces in the motor create energy at the commutation frequency. There will also be energy in the harmonics at 2f, 3f, 4f, etc. For purposes of illustration, the commutation frequency of the motor is 2.88 kHz and the torsion mode frequency is 5.76 kHz (i.e., coincidental with the 2f component of the commutation frequency). However, it should be understood that these frequencies are dependent on the design of the motor and the stator/shaft assembly and are not meant to limit the invention.

The shaft and stator have a torsion mode frequency associated with the geometrical features and material properties of the shaft/stator assembly. When the torsion frequency is near the driving force frequency (5.76 kHz) 110, the sound pressure is high (approximately 47 dB) 120. However, the sound pressure falls off quite rapidly as the torsion mode frequency is reduced. The grooved or stepped shaft 130 allows the torsional mode frequencies to be adjusted to frequencies between 4.6 kHz 140 and 5.2 kHz 150. Accordingly, the peak sound pressure at a driving force frequency of 5.76 kHz is in the range of 13 dB 160 to 25 dB 170. This is 22 to 34 dB lower than the standard shaft. FIG. 2 also illustrates less effective processes for attempting to tune the torsion mode frequency of the shaft/stator assembly away from the motor drive force component 180.

Figure 3:
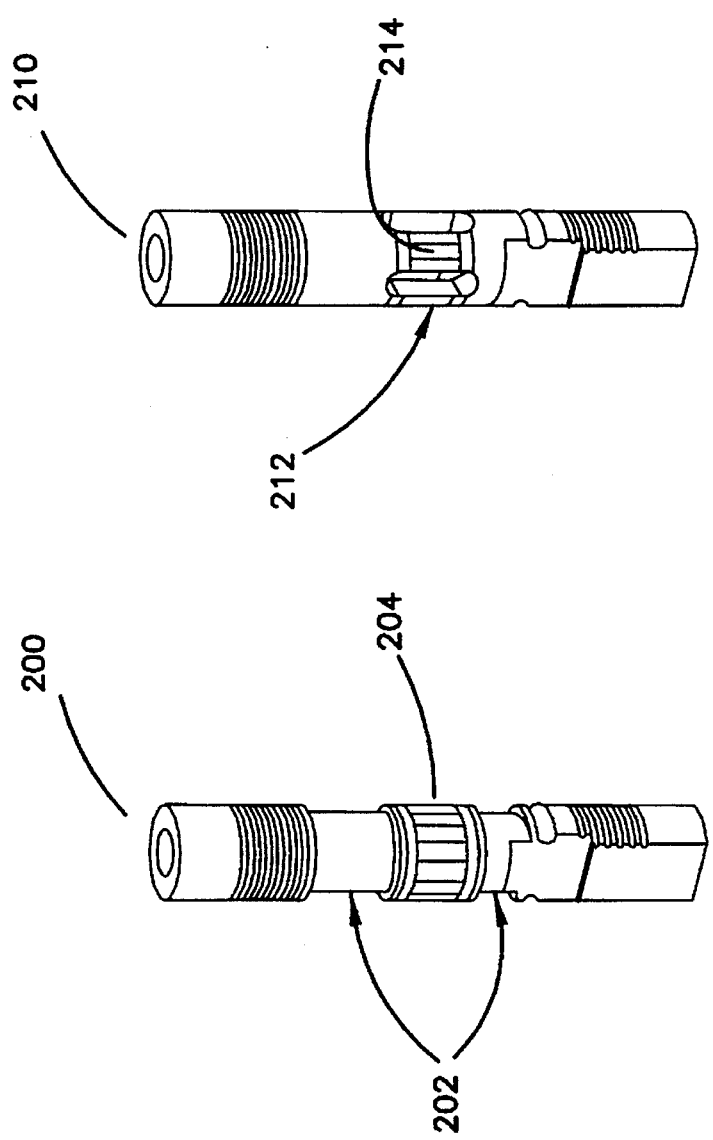
FIG. 3a is an illustration of the stepped shaft according to the present invention.
FIG. 3b is an illustration of the slotted shaft according to the present invention.
FIG. 3c is an illustration of a shaft according the present invention having cross-drilled holes normal to the shaft axis.

FIGS. 3a, 3b and 3c illustrate three shaft geometries 200, 210, 220 for eliminating acoustic noise according to the present invention. The stepped shaft 200 of FIG. 3a has circumferential grooves 202 cut above and below the knurled region 204. The slotted shaft 210 of FIG. 3b has slots 212 parallel to the shaft axis cut into the knurled region 214. Finally, the cross-drilled shaft 220 of FIG. 3c has holes 222 drilled through the shaft above and below the knurled region 224.

The stepped shaft 200 is superior from a manufacturing and cost point of view. Since turning operations are required in the existing manufacturing process to produce the over-all diameter and for cutting the bond grooves and undercuts at the end of the knurled region (see FIG. 1a), there is no re-tooling or re-fixturing required to cut the grooves. The other geometries (slots 210 or holes 220) require machining operations in addition to cutting circumferential grooves. However, a shaft design according to the present invention need not be limited to using a single type of geometrical feature.

Figure 4:
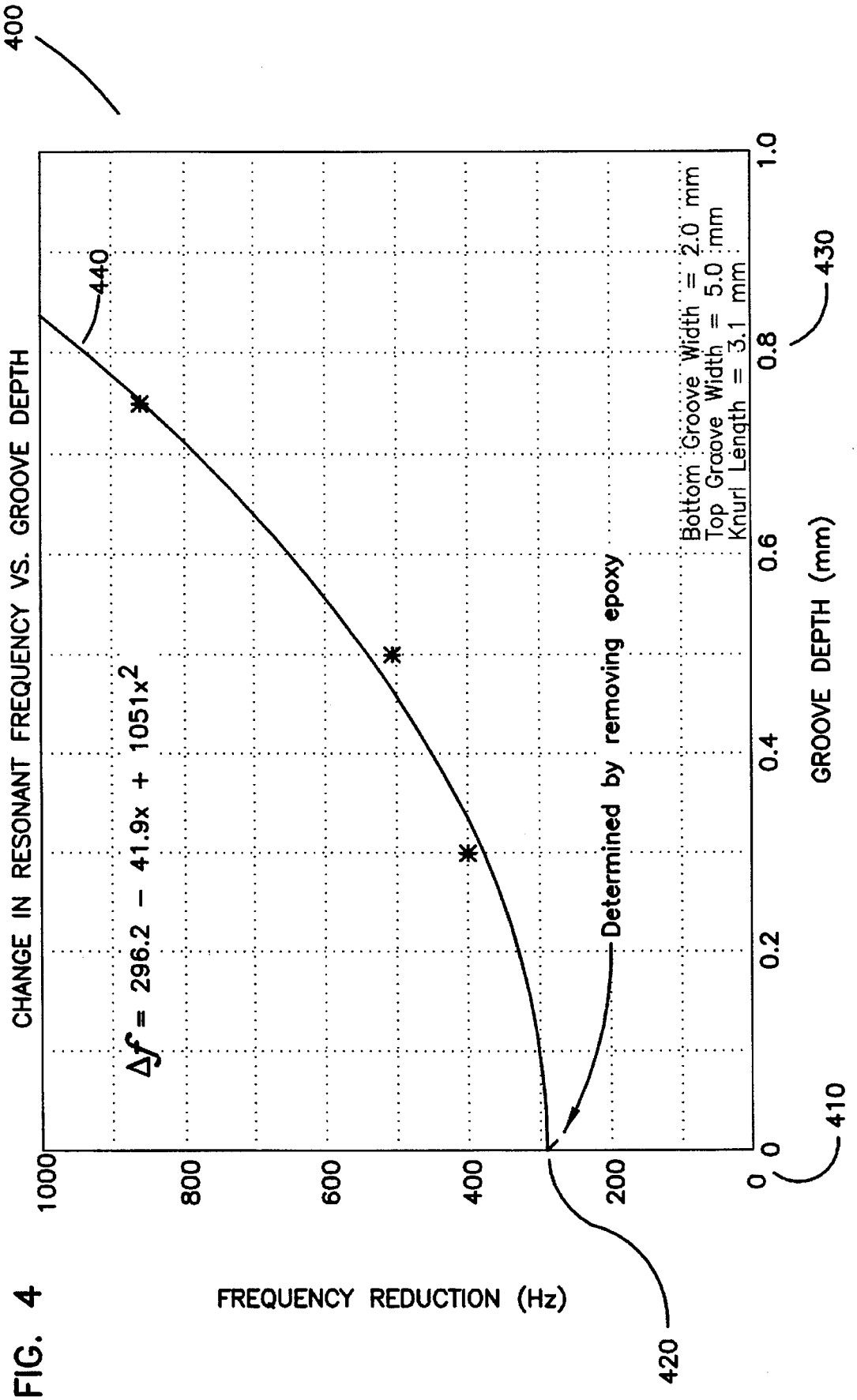
FIG. 4 is a graph of the change in resonant frequency of a shaft/stator assembly vs. the depth of circumferential grooves on the shaft.

For the stepped or grooved shaft, the groove width and depth dimensions control how much the torsion mode frequency is reduced. FIG. 4 is a graph of the change in resonant frequency vs. groove depth 400 which shows the torsion mode frequency reduction as a function of groove depth (the groove widths were held constant). Note that at zero groove depth 410, a frequency reduction of 300 Hz 420 was obtained by removing the epoxy bond which exists between the stator and shaft. Groove depths of 0.8 mm 430 result in a reduction of the shaft/stator assembly's torsion mode frequency of approximately 930 Hz 440.

Figure 5B:
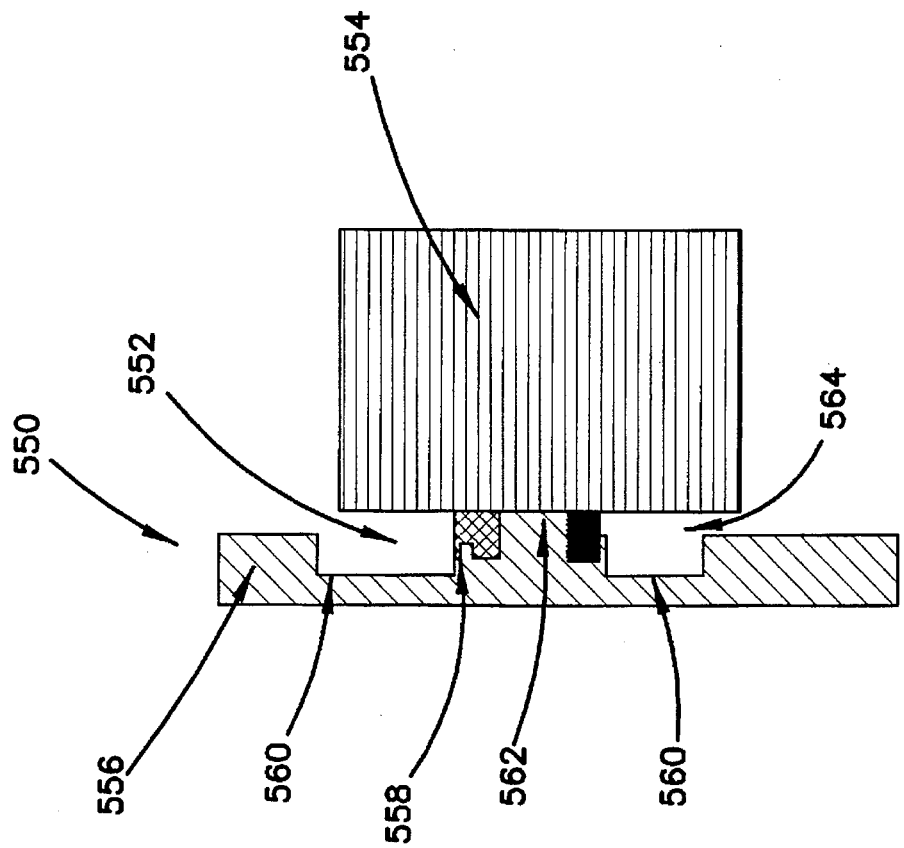
FIG. 5b is a partial cross-sectional view of the stator/shaft assembly according to the present invention.
Figure 5A:
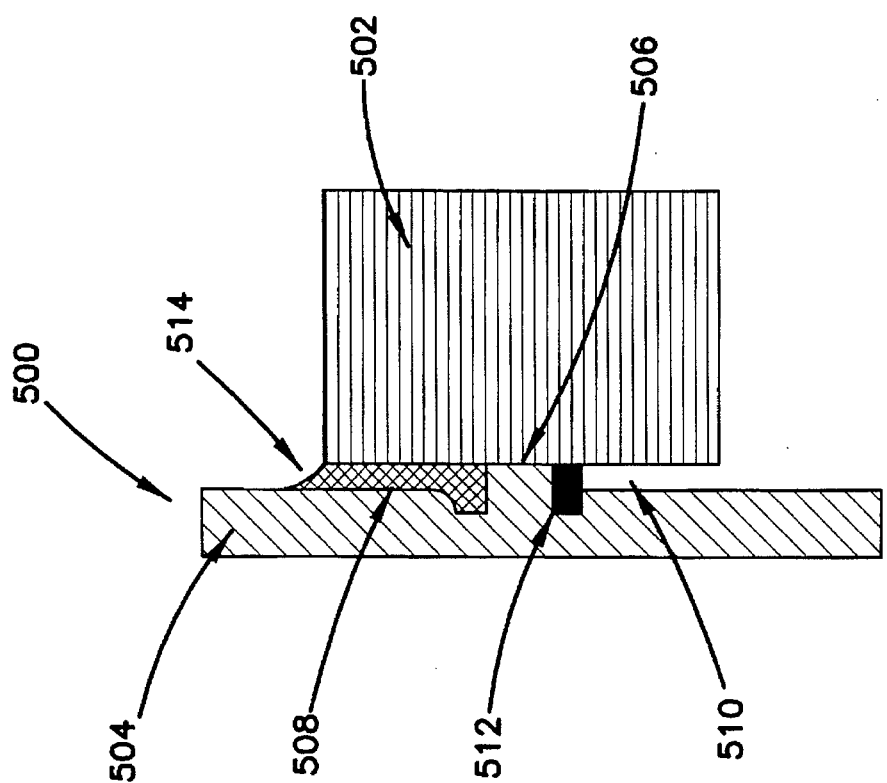
FIG. 5a is a partial cross-sectional view of the standard attachment between the stator and shaft.

FIG. 5a shows a partial cross-sectional view 500 of the standard attachment between the stator 502 and shaft 504. The attachment involves press-fitting the stator 502 onto the knurled region 506 which is covered with epoxy 508. As the stator is pushed up the shaft 504 from the bottom end, excess epoxy 508 is carried up the shaft 504 (in the clearance gap) by the inner diameter of the stator 502. Due to the knurled region 506, a nominal gap 510 of approximately 0.02 mm. exists between stator 502 and the unknurled region of shaft 504, while an interference exists between the stator 502 and the knurled region 506 for press-fitting of the stator 502 to the shaft 504. Some excess epoxy and metallic shavings accumulate in the undercuts 512 during the press-fit process. One purpose of the epoxy is to encapsulate these metal shavings thereby preventing contamination of the disk drive.

When the process is finished, the stator 502 is both pressed and bonded to the shaft as shown in FIG. 5a. The "extra" attachment 514 provided by the epoxy 508 above the knurled region 506 has a stiffening effect on the torsion mode. The removal of this epoxy 508 results in a reduction in the torsion mode frequency (e.g., 300 Hz in the example discussed herein).

FIG. 5b is a partial cross-sectional view of the stator/shaft assembly 550 according to the present invention. In addition to the stiffness reduction obtained by the material removal, the gap 552 between the inner diameter of the stator 554 and outer diameter of the shaft 556 is large enough such that the epoxy 558 can no longer bridge the distance created by the steps or grooves 560 to form a bond which tends to shunt the stiffness reduction. Accordingly, there will be less torsion frequency variation part-to-part due to epoxy variations that would certainly be present in the standard design.

Another advantage provided by the stepped shaft according to the present invention and illustrated in FIG. 5b is the ability to design the geometry to avoid assembly alignment problems between the stator 554 and shaft 556. The axis of the stator 554 is required to be as parallel to the axis of the shaft 556 as possible to avoid magnetic gap variations between the outer diameter of the stator 554 and inner diameter of the magnet (not shown). If the grooves 560 are wide enough such that the top and bottom widths of the stator 554 cannot contact the modified shaft 556 outer diameter, and if the press-fit region at the knurl 562 is not long compared to the diameter of the shaft 556, it is possible for the stator 554 to be "cocked" with respect to the shaft 556. This can be avoided by designing one of the groove widths such that there is a "locator region" 564 where a short axial length of the stator 554 overlaps a portion of the shaft 556 that is not grooved.

Another advantage of the stepped shaft according to the present invention is that thermal track-misregistration (TMR) or screw torque problems are not introduced in the process of reducing or eliminating the acoustic problem. In prior attempts to reduce acoustic noise, a small constrained-layer (i.e., a "compliant washer") was disposed between the end of the shaft and the device enclosure thereby reducing the torsion mode frequency and increasing the damping of the mode. However, if the washer is compliant, creep effects take place over time so that the screw that attaches the shaft to the device enclosure becomes loose. Under these conditions the track-to-track offset TMR would be affected. However, the stepped shaft according to the present invention makes no changes to the shaft/device enclosure interface and therefore poses no problem in this respect.

Figure 6:
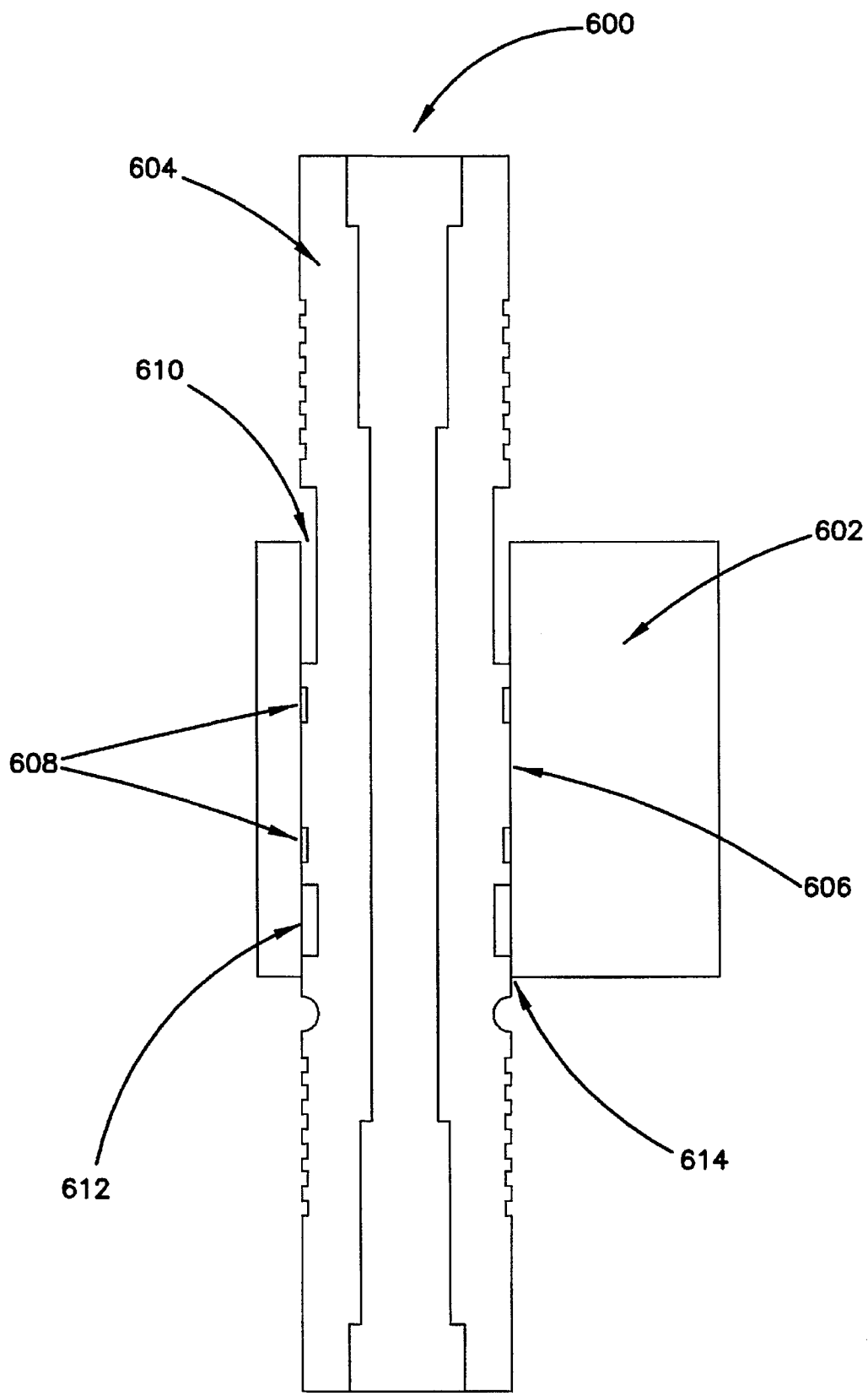
FIG. 6 is a cross-sectional view of a stator/shaft assembly showing the full diameter of the stator and shaft.

FIG. 6 is a cross-sectional view of a stator/shaft assembly 600 showing the full diameter of the stator 602 and shaft 604. As discussed above, the stator 602 is press-fitted over a knurled region 606 of the shaft 604. Undercuts 608 above and below the knurled region 606 capture excess epoxy and metallic shavings generated when the stator 602 is pushed up on the knurled region 606 of the shaft 604. The upper step region 610 and the lower step region 612 are illustrated as having different widths so as to create the locator region 614 for aligning the stator and shaft as discussed above with reference to FIG. 5b. According to the invention, predetermined, but variable, amounts of material may be removed from a shaft. Thus, the stiffness of the stator/shaft assembly may be adjusted thereby allowing continuous tuning of the torsion mode frequency of the shaft.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A spindle motor shaft for a disk drive system having a longitudinal axis, the shaft being coupled to a stator for generating motor drive forces at a driving force frequency, the shaft and stator further having a torsion mode frequency, the spindle motor shaft comprising at least one torsion mode frequency aperture formed in the spindle motor shaft, the torsion mode frequency aperture reducing the stiffness of the shaft and moving the torsion mode frequency away from the driving force frequency.

2. The spindle motor shaft of claim 1 wherein the at least one torsion mode frequency aperture comprises at least one circumferential groove.

3. The spindle motor shaft of claim 2 wherein the circumferential groove comprises a first predetermined width, the first predetermined width of the groove being selected to form a locator region along the shaft axis to promote axial alignment of the shaft and stator.

4. The spindle motor shaft of claim 3 wherein the locator region comprises an ungrooved portion of the shaft, the groove of a first predetermined width and the ungrooved portion of the shaft being overlapped by a short axial length of the stator, the ungrooved portion of the shaft preventing the stator from becoming cocked with respect to the shaft.

5. The spindle motor shaft of claim 2 wherein the shaft further comprises a knurled region generally centrally disposed along the axis of the shaft, the knurled region being coated with epoxy and the stator being moved onto and press-fitted over the knurled region, the circumferential groove preventing epoxy being expunged from between the shaft and the stator during the press-fitting from being wicked up the shaft by the movement of the stator onto the knurled region.

6. The spindle motor shaft of claim 1 wherein the at least one torsion mode frequency aperture comprises radial slots cut in the shaft.

7. The spindle motor shaft of claim 6 wherein the radial slots comprise longitudinal axes, the axes of the radial slots being parallel to the axis of the shaft.

8. The spindle motor shaft of claim 1 wherein the at least one torsion mode frequency aperture comprises transverse holes disposed along the axis of the shaft.

9. The spindle motor shaft of claim 1 wherein the shaft further comprises a knurled region disposed generally centrally along the axis of the shaft, the stator being press-fitted over the knurled region.

10. The spindle motor shaft of claim 9 wherein the shaft further comprises undercuts above and below the knurled region to capture metallic shavings created during the stator press-fitting process.

11. The disk drive system of claim 10 wherein the at least one torsion mode frequency aperture comprises at least one circumferential groove.

12. The disk drive system of claim 11 wherein the circumferential groove comprises a first predetermined width, the first predetermined width of the groove being selected to form a locator region along the shaft axis to promote axial alignment of the shaft and stator.

13. The disk drive system of claim 12 wherein the locator region comprises an ungrooved portion of the shaft, the groove of a first predetermined width and the ungrooved portion of the shaft being overlapped by a short axial length of the stator, the ungrooved portion of the shaft preventing the stator from becoming cocked with respect to the shaft.

14. The disk drive system of claim 11 wherein the shaft further comprises a knurled region generally centrally disposed along the axis of the shaft, the knurled region being coated with epoxy and the stator being moved onto and press-fitted over the knurled region, the circumferential groove preventing epoxy being expunged from between the shaft and the stator during the press-fitting from being wicked up the shaft by the movement of the stator onto the knurled region.

15. A disk drive system, comprising:

a device enclosure;

at least one storage disk;

a motor, coupled to the device enclosure and the storage disk, for rotating the storage disk;

a positional head assembly, coupled to the storage disk, for transferring data to and from the storage disk; and a disk controller, connected to the motor and the positional head assembly, for controlling the position of the storage disk and the head assembly; and wherein the motor comprises a spindle motor shaft having a longitudinal axis, the shaft being coupled to a stator for generating motor drive forces at a driving force frequency, the shaft and stator further having a torsion mode frequency, the spindle motor shaft comprising at least one torsion mode frequency aperture formed in the spindle motor shaft, the at least one torsion mode frequency aperture reducing the stiffness of the shaft and moving the torsion mode frequency away from the driving force frequency.

16. The disk drive system of claim 15 wherein the at least one torsion mode frequency aperture comprises radial slots cut in the shaft.

17. The disk drive system of claim 16 wherein the radial slots comprise longitudinal axes, the axes of the radial slots being parallel to the axis of the shaft.

18. The disk drive system of claim 15 wherein the at least one torsion mode frequency aperture comprises transverse holes disposed along the axis of the shaft.

19. The disk drive system of claim 15 wherein the shaft further comprises a knurled region disposed generally centrally along the axis of the shaft, the stator being press-fitted over the knurled region.

20. The disk drive system of claim 19 wherein the shaft further comprises undercuts above and below the knurled region to capture metallic shavings created during the stator press-fitting process.

21. A method of making a spindle motor shaft for a disk drive having a longitudinal axis, the shaft being coupled to a stator for generating motor drive forces at a driving force frequency, the shaft and stator further having a torsion mode frequency, the method comprising:

creating a cylindrical shaft of a predetermined length;

forming at least one torsion mode frequency aperture in the spindle motor shaft, the at least one torsion mode frequency aperture reducing the stiffness of the shaft and moving the torsion mode frequency away from the driving force frequency.

22. The method of claim 21 wherein the step of forming at least one torsion mode frequency aperture on the shaft comprises forming at least one circumferential groove.

23. The method of claim 22 wherein the circumferential groove comprises a first predetermined width, the first predetermined width of the groove being selected to form a locator region along the shaft axis to promote axial alignment of the shaft and stator.

24. The method of claim 23 wherein the locator region comprises a ungrooved portion of the shaft, the groove of a first predetermined width and the ungrooved portion of the shaft being overlapped by a short axial length of the stator, the ungrooved portion of the shaft preventing the stator from becoming cocked with respect to the shaft.

25. The method of claim 22 further comprises the steps of forming a knurled region disposed generally centrally along the axis of the shaft, the stator being press-fitted over the knurled region, and forming undercuts above and below the knurled region to capture metallic shavings created during the stator press-fitting process.

26. The method of claim 21 wherein the step of forming the at least one torsion mode frequency aperture on the shaft comprises forming at least one radial slot in the shaft.

27. The method of claim 26 wherein the at least one radial slot comprises a longitudinal axis, the axis of the at least one radial slot being parallel to the axis of the shaft.

28. The method of claim 21 wherein the step of forming the at least one torsion mode frequency aperture comprises forming transverse holes disposed along the axis of the shaft.

* * * * *